United States Patent
Ciochina et al.

(10) Patent No.: US 12,335,990 B2
(45) Date of Patent: Jun. 17, 2025

(54) ACCESS POINTS, STATION AND CORRESPONDING METHODS

(71) Applicant: Sony Group Corporation, Tokyo (JP)

(72) Inventors: Dana Ciochina, Stuttgart (DE); Thomas Handte, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 424 days.

(21) Appl. No.: 17/772,666

(22) PCT Filed: Nov. 5, 2020

(86) PCT No.: PCT/EP2020/081069
§ 371 (c)(1),
(2) Date: Apr. 28, 2022

(87) PCT Pub. No.: WO2021/089674
PCT Pub. Date: May 14, 2021

(65) Prior Publication Data
US 2023/0009996 A1    Jan. 12, 2023

(30) Foreign Application Priority Data
Nov. 5, 2019    (EP) .................................... 19207231

(51) Int. Cl.
*H04W 72/542*    (2023.01)
*H04W 52/36*    (2009.01)

(52) U.S. Cl.
CPC ....... *H04W 72/542* (2023.01); *H04W 52/367* (2013.01)

(58) Field of Classification Search
CPC . H04W 72/542; H04W 52/367; H04W 24/10; H04W 72/121; H04W 84/12; H04L 5/0048; H04L 5/0057; H04B 7/086
(Continued)

(56) References Cited

U.S. PATENT DOCUMENTS

2018/0323921 A1    11/2018    Choi
2019/0041509 A1 *   2/2019    Jiang .................. H04W 24/10
(Continued)

FOREIGN PATENT DOCUMENTS

CN    108353425 A    7/2018
CN    108476503 A    8/2018
(Continued)

OTHER PUBLICATIONS

International Search Report and Written Opinion mailed on Jan. 13, 2021, received for PCT Application PCT/EP2020/081069, Filed on Nov. 5, 2020, 9 pages.
(Continued)

*Primary Examiner* — Mang Hang Yeung
(74) *Attorney, Agent, or Firm* — XSENSUS LLP

(57) ABSTRACT

An approach is presented, by which an access point can identify and trigger stations with stringent latency requirements or with periodic traffic to transmit to their corresponding access points, simultaneously with uplink traffic from its own service set. The existing spatial reuse is improved to take into account receive beamforming capabilities at the access points. Furthermore, an approach is presented to gather the channel information in an efficient manner and enhance the triggering procedures to allow stations from overlapping cells to access the channel, during the transmit opportunities or resource units allocated to other users.

19 Claims, 11 Drawing Sheets

(58) Field of Classification Search
USPC .......................................................... 370/329
See application file for complete search history.

(56) References Cited

U.S. PATENT DOCUMENTS

2019/0342891 A1* 11/2019 Asterjadhi ............ H04W 24/10
2021/0084686 A1* 3/2021 Zhang .................... H04L 5/0094

FOREIGN PATENT DOCUMENTS

| CN | 109245859 A | 1/2019 |
| CN | 110024338 A | 7/2019 |
| EP | 2642781 A1 | 9/2013 |
| WO | 2017/171531 A1 | 10/2017 |
| WO | WO-2018084404 A1 | 5/2018 |

OTHER PUBLICATIONS

IEEE, "Part 11: Wireless LAN Medium Access Control (MAC) and Physical Layer (PHY) Specifications", IEEE Computer Society, IEEE P802.11ax™/D4.1, Apr. 2019, pp. 1-754.

IEEE, "Part 11: Wireless LAN Medium Access Control (MAC) and Physical Layer (PHY) Specifications", IEEE Computer Society, IEEE Std 802.11™-2016, Dec. 7, 2016, pp. 1-3532.

\* cited by examiner

ACCESS POINTS, STATION AND CORRESPONDING METHODS

CROSS-REFERENCE TO RELATED APPLICATIONS

The present application is based on PCT filing PCT/EP2020/081069, filed Nov. 5, 2020, which claims priority to EP 19207231.2, filed on Nov. 5, 2019, the entire contents of each are incorporated herein by reference.

BACKGROUND

Field of the Disclosure

The present disclosure relates to different access points, a station and corresponding methods.

Description of Related Art

Low latency or real time applications have stringent requirements on fast or periodic channel access. For example, within one WLAN Basic Service Set (BSS; also called cell hereinafter), in which one or more stations (STAs) are associated with one access point (AP) serving the one or more STAs, these requirements are relatively easy to achieve. However, this is no longer the case when STAs are within the range of multiple overlapped BSSs (OBSS), managed by different APs, with which one or more other STAs are associated in the respective other BSS(s). One or more of the other STAs, also called overlapping STAs (oSTAs), associated with another AP serving another BSS are then in the range of the AP serving the one or more STAs.

Spatial reuse (SR) techniques are defined in the upcoming 802.11ax amendment of the IEEE 802.11 standard. These allow oSTAs from overlapped BSSs to transmit during a time interval scheduled by an AP as long as the interference at the AP can be guaranteed to be lower than a tolerable level.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to provide an access point and a station that enable enhanced uplink spatial reuse. It is a further object to provide corresponding methods as well as a corresponding computer program and a non-transitory computer-readable recording medium for implementing said methods.

According to an aspect there is provided a first access point comprising circuitry configured to communicate with one or more first stations associated with the first access point,
  transmit a trigger requesting stations to transmit data units containing channel estimation sequences enabling channel estimation and/or channel feedback information,
  determine channel information based on channel estimation sequences and/or the channel feedback information transmitted from one or more of said first stations and from one or more second stations associated with a second access point, and
  determine, based on the determined channel information, spatial reuse parameters for use by the first access point for reception of data during spatial reuse of resources, which are allocated to one or more of said first stations for transmission of data to the first access point, by one or more of said second stations for transmission of data to the second access point.

According to a further aspect there is provided a station comprising circuitry configured to
  communicate with an associated second access point,
  receive a trigger from a first access point to which one or more first stations are associated, the trigger requesting stations to transmit data units containing channel estimation sequences enabling channel estimation and/or channel feedback information,
  transmit channel estimation sequences enabling channel estimation and/or channel feedback information to the first access point,
  receive, from the second access point or the first access point, an individual transmit power level or individual transmit power limit,
  receive, from the first access point, resource allocation information indicating resource units allocated to the second station for spatial reuse, and
  transmit data, using the allocated resource units and the received individual transmit power level or a transmit power level equal to or lower than the received individual transmit power limit, during spatial reuse of resources allocated by the first access point to one or more of said first stations for transmission of data to the first access point.

According to a further aspect there is provided a second access point comprising circuitry configured to
  communicate with one or more second stations associated with the second access point,
  receive a trigger from a first access point to start estimating a channel between the second access point and one or more first stations associated with the first access point and/or one or more second stations,
  determine channel information based on data units transmitted from one or more of said first and second stations, said data units containing channel estimation sequences enabling channel estimation and/or channel feedback information,
  identify one or more second stations using resource units allocated for spatial reuse and/or random access by the first access point, and
  transmit identification information to the first access point indicating if and/or for which one or more second stations spatial reuse is possible or considered.

According to a further aspect there is provided a first access point comprising circuitry configured to
  communicate with one or more first stations associated with the first access point, and
  notify one or more second stations associated with a second access point that they are allowed to transmit data to the associated second access point during spatial reuse of resources allocated to one or more of said first stations for transmission of data to the first access point.

According to still further aspects corresponding methods, a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Embodiments are defined in the dependent claims. It shall be understood that the disclosed station, the disclosed methods, the disclosed computer program and the disclosed computer-readable recording medium have similar and/or identical further embodiments as the claimed access point and as defined in the dependent claims and/or disclosed herein.

One of the aspects of the disclosure is to enable STAs with stringent latency requirements or with periodic traffic to access uplink resource units (RUs) in another BSS than their own. Another aspect may be to collect channel information from STAs in an efficient manner in order to find uplink (UL) beamforming parameters (i.e. beamforming vectors) for reception by an AP during a spatial reuse phase, in which one or more STAs associated with the AP and one or more oSTAs associated with another AP of an OBBS may share the same frequency and/or time resources for transmission. Further, in an embodiment a triggering procedure is provided to allow STAs from overlapping cells to access the channel during the transmit opportunities or resource units allocated to other STAs. Existing spatial reuse concepts may be further improved to take into account receive beamforming capabilities at the APs.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
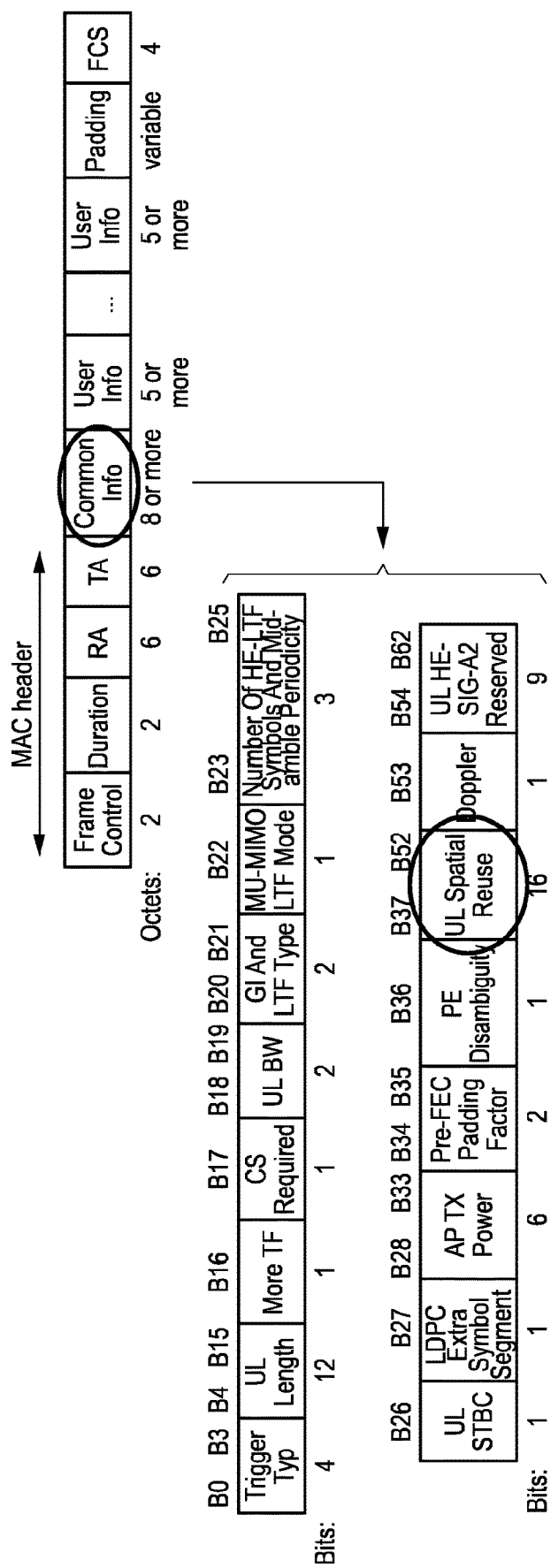
FIG. 1 shows a diagram of a trigger frame according to IEEE P802.11ax D4.0 including UL SR information.

FIG. 1 shows a diagram of a trigger frame according to IEEE P802.11ax D4.0 including UL SR information. The UL SR scheme is designed in IEEE P802.11ax D4.0 under the assumption that the AP has no information about the STAs which may utilize the SR RU. In this context, the tolerable interference limits are set such that for all STAs which are particularly addressed to use an RU some QoS (Quality of Service) metric is satisfied, e.g., min SNR or PER below threshold, whereas the STAs that are not addressed may access if they respect the SR condition. This behavior can be quite limiting, particularly in scenarios in which the STAs with the worst case SNR are spatially well separated from a STA that wants to use the same frequency time slot to transmit to its own AP, in a spatial reuse manner. In the context of coordinated nulling, most schemes are focused on the downlink and require relatively good synchronization between the APs involved in the nulling procedure.

In this context, a STA requiring nulling (further referred to as STA from overlapping BSS or overlapping STA (oSTA)) is a STA for which interference should be minimized, e.g. by means of a beamforming design. In this disclosure, an oSTA is a STA from an overlapping BSS which transmits to its own access point in the same time and frequency resources that are used by another STA when transmitting to its corresponding access point. In this disclosure, the latter access point is referred to as master access point (or first access point) which allocates resources to its own STAs (first stations) and determines if spatial reuse of these resources with an oSTA (second station) is possible. For this purpose, the master AP may design and apply receive beamforming vectors in such a way as to minimize the interference from the oSTAs while ensuring an acceptable quality of reception from its own STA. The AP with which the oSTA communicates will be referred to as overlapping AP (oAP) (or second access point). In some scenarios, coordination between the AP and oAP is necessary in order to ensure the proper reuse of resources. In these cases, it will be assumed that the AP takes the role of a master AP and the oAP the one of a slave AP, which performs estimation and provides required feedback to the master AP.

The present disclosure aims at proposing mechanisms to allow oSTAs, e. g. with stringent or periodic traffic requirements, to access the uplink resource units of STAs in other BSSs than their own. For this purpose, receive beamforming schemes at an AP or master AP may be designed to cancel interference from oSTAs during RUs allocated for the uplink transmission of the STAs associated to the respective AP. When such receive beamforming schemes are feasible, oSTAs can be allowed to share the RUs with the STAs associated with the AP. Further, an enhanced spatial reuse criterion, based on the receive beamforming capabilities at the APs involved, and a protocol flow to allow its implementation are presented. Embodiments are configured to efficiently identify oSTAs which require UL SR and to gather channel information for both STAs and oSTAs with reduced overhead.

Figure 2:
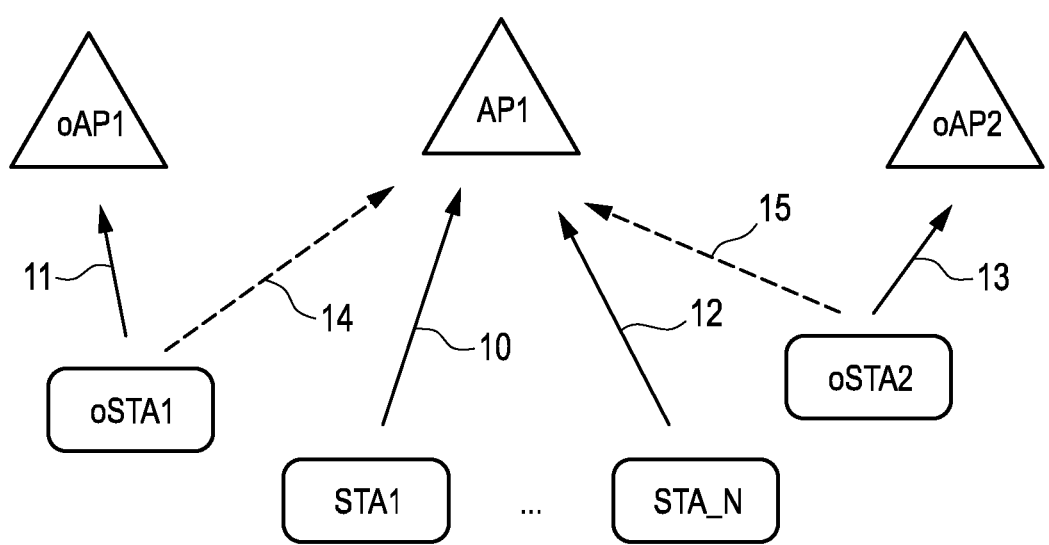
FIG. 2 shows a schematic diagram of an exemplary embodiment of a communication system according to the present disclosure.

The following description focuses on uplink nulling due to several reasons. Firstly, due to the differences in the transmit powers, it may be more feasible to achieve the nulling in uplink than in downlink. Secondly, there may be more usable degrees of freedom at the AP in the UL than in the DL due to non-AP STAs having fewer streams to simultaneously transmit. For example, in multi-user (MU) MIMO scenarios, multiple streams for all STAs can be transmitted in DL on the same resource unit, however in the uplink the STAs respond in separate resource units. Such a scenario is depicted in FIG. 2 showing a schematic diagram of an exemplary embodiment of a communication system according to the present disclosure that can make use of UL SR. Here, arrows 10 and 11 indicate UL transmissions of a useful signal using RU set 1, arrows 12 and 13 indicate UL transmissions of a useful signal using RU set 2, arrow 14 indicates interference using RU set 1, and arrow 15 indicates interference using RU set 2.

The communication system includes a first access point AP1 (which may assume the role of and referred to as master access point), to which a number of first stations STA1 to STA_N are associated, and two second access points oAP1 and oAP2, each with an associated second station oSTA1 and oSTA2, respectively, from an overlapped BSS (oBSS). The goal is to design the receive beamformers at the APs (AP1, oAP1 and oAP2) such that first stations and the second stations can simultaneously transmit to their respective access points, with which they are associated and be correctly received with an acceptable quality of service. According to the present disclosure, in UL there may generally be one or more STAs per RU so that the AP can have enough degrees of freedom to design receive beamforming vectors, which cancel interference from particular oSTAs.

Compared to DL schemes, especially joint transmission, synchronization requirements to achieve the uplink nulling are significantly reduced. For the schemes proposed herein, the main requirement is that each participating AP is able to listen simultaneously to several STAs and compute an individual spatial reuse criterion. In another scenario included here, some amount of coordination between APs and oAPs is needed, as information regarding the oSTAs and spatial reuse feasibility and parameters is exchanged between the access points involved. In both cases however, the requirements on synchronization and coordination are less stringent than the current coordinated downlink nulling.

The following cases, from most particular to most general, will be addressed in the following:

1. Information regarding the oSTAs which may need to transmit, simultaneously with one or more of the STAs is available at the master AP. This scenario is, e.g., relevant for oSTAs, which need to send periodic traffic/control information or updates e.g., a virtual reality (VR) set sending control information. It will be referred to oSTAs in this case as "known" oSTAs.
2. Only information regarding a set of oSTAs, from which one oSTA may be allowed to transmit according to buffer situation/priority information/contention rules in a spatial reuse manner is available at the AP, however no individual information regarding the specific oSTAs. This is e.g. relevant within a low latency industrial internet of things (IOT) scenario, in which many devices may need to send updates.
3. No information of whether there exist oSTAs which may need to transmit in a spatial reuse manner is available at the AP. It will be referred to oSTAs in cases 2 and 3 as "unknown" oSTAs.

In all three cases, a spatial reuse criterion is defined, which relies on the fact that channel state information (CSI) is available at the AP. The differences between the three cases lie in the methods to address the oSTAs and gather the relevant CSI, with reasonable training overhead.

Firstly, the approach of beamforming based UL SR will be described. Unlike the current SR scheme, the AP does not compute an overall interference limit but an individual one, based on its beamforming capabilities and the required quality of service (QoS) constraints at its STAs. To allow the simultaneous transmission of an oSTA during the transmission of its own STAi within the RUi, the AP should be able to design its receive beamformers such that it guarantees the reception of STAi with a required SINR, in the presence of the interference from oSTA. For this, channel estimates of both STAi and oSTA should be available at the AP.

In more detail, in order for the first AP to be able to decode the message from its own STA in the presence of interference from oSTA1, it should to be able to design receive beamforming vectors $u_1$ such that the signal to interference plus noise condition is satisfied:

$$\frac{u_1^H q_1 R_1^{(1)} u_1}{u_1^H (q_2 R_2^{(1)} + \sigma_1^2) u_1} \geq \gamma_1 \qquad (1)$$

where $R_1^{(1)}$, $R_2^{(1)}$ are channel covariance matrices of from STA1 and oSTA1, respectively, to AP1, q1 and q2 are transmit power levels of STA1 and oSTA1 respectively, $\sigma_1^2$ is noise variance and $y_1$ is the SINR threshold.

At the same time, in order for oAP1 to be able to decode the message from oSTA1, it should satisfy a similar condition i.e., it should be able to design receive beamforming vectors $u_2$ so that some SINR condition is satisfied $$\frac{q_2 u_2^H R_2^{(2)} u_2}{u_2^H (q_1 R_1^{(2)} + \sigma_2^2) u_2} \geq \gamma_2 \qquad (2)$$

where $R_1^{(2)}$, $R_2^{(2)}$ are channel covariance matrices of from STA1 and oSTA1 respectively to AP2 while $\sigma_2^2$ and $y_2$ denote the noise variance at AP2 and, respectively, the SINR threshold for a reasonable error rate.

For OFDM schemes, the conditions in (1) and (2) are defined per subcarrier or group of subcarriers. Furthermore, the STA and oSTA, for which these conditions are tested, have trained on the same bandwidth, partial bandwidth or resource unit. A further preselection based on the correlation strength between STA and oSTA and traffic requirements of the STAs can be used to identify the pairs for which the conditions are checked.

As can be noticed from (1) and (2), only the APs can compute the SR conditions, due to the dependence on beamforming capabilities and on channel information, only available to themselves. With the current sounding and BF trigger schemes defined in IEEE 802.11, only CSI from STAs directly served by AP can be gathered (not from oSTAs). However, an optimal $u_1$ cannot be computed only with feedback from STA1. AP can compute a suboptimal $u_1$ as matched to the channel of STA1 and then use this in a subsequent stage to allow oSTAs to decide on whether these can respect an SR condition as currently defined. There may, however, be disadvantages to this scheme: firstly, the $u_1$ beamforming vector is suboptimal, as it does not consider the interference at all. Secondly, it implies to have a separate training step for oSTAs.

If the AP uses the same beamforming weight $u_1$ to transmit towards STA1 as well as to receive from STA 1, then an approach similar to the one currently used for SR can be defined. However, employing the same BFs in DL and UL is not always useful or necessary (for instance, in the MU case, in which DL BF is used for transmitting streams to various users, whereas a response is on separate RUs in the uplink).

If $u_1$ is from a predefined dictionary, then again the existing SR approach can be used in that, the various defined beamforming sequences are modulating estimation sequences and the STAs and oSTAs involved can compute by themselves, whether interference limits can be respected or not. However, in this case, the problem becomes combinatorial and sounding can take long time.

The disclosed approach is based on estimating channel information directly $R_1^{(1)}, R_2^{(1)}, R_1^{(2)}, R_2^{(2)}$. Based on this information, it is decided upon the feasibility of the spatial reuse for particular combinations of STAs and oSTAs and power requirements to be fulfilled by these.

The beamforming vectors in (1) and (2) may be easily found by solving a generalized eigenvector problem, for fixed q1 and q2. To handle the uplink powers several methods can be thought of. In an embodiment it is proposed to consider the uplink power of the RU holder i.e., q1 in this example, as fixed, and to define a maximum acceptable limit for q2. At AP2, for fixed q1 a feasibility problem is solved, based on which AP2 decides if, with the indicated level of q1, it is able to decode the signal from oSTA1. In case of infeasibility, it can make a suggestion to AP1 regarding the largest q1 below the indicated threshold, which allows an acceptable transmission from oSTA1 to oAP1. Finally, AP1 indicates the acceptable levels of q1 and q2 to the STA1 and oSTA1, respectively.

In this context, determining the beamforming vectors by solving a generalized eigenvector problem means that in order to find the beamforming vectors that satisfy criteria (1) and (2), a generalized eigenvalue decomposition, with particular matrices for the first and second criterion (see below the explanation of FIGS. 6A and 6B), may be made. The largest eigenvector may then be used as the optimum receive beamforming vector.

SR feasibility means that there exist beamforming vectors for which the SINR criteria can be respected for certain power levels. One option to indicate SR infeasibility is by setting in the recommended power levels 0 and to indicate feasibility by setting the power to a positive value. However, more explicit indications can also be found.

In order to implement a protocol based on the above-described approach, modifications to the current SR and sounding procedures are suggested. These will be explained in the following.

In one embodiment sounding for gathering of CSI from STAs and oSTAs is applied. Currently, only STAs within the BSS can be triggered to send feedback information as part of a sounding phase. Thus, with the current procedures it is not possible to obtain sounding information from the oSTAs. Secondly, in order to keep the overhead reasonable, the CSI should only be gathered from oSTAs which have stringent traffic requirements. However, the AP may not always know which are these STAs or whether there are indeed oSTAs, which need to transmit to their corresponding oAPs. Thus, it is desired to define/enhance the sounding protocol to allow for gathering UL channel information from both the STAs to be served by the AP (triggered directly), as well as sounding and identification information from oSTAs, with low overhead. The latter can be triggered either directly, if known, e.g., in the case of some periodic allocation that is known among neighboring APs, or indirectly, by allowing a range of RUs for random access.

Figure 3:
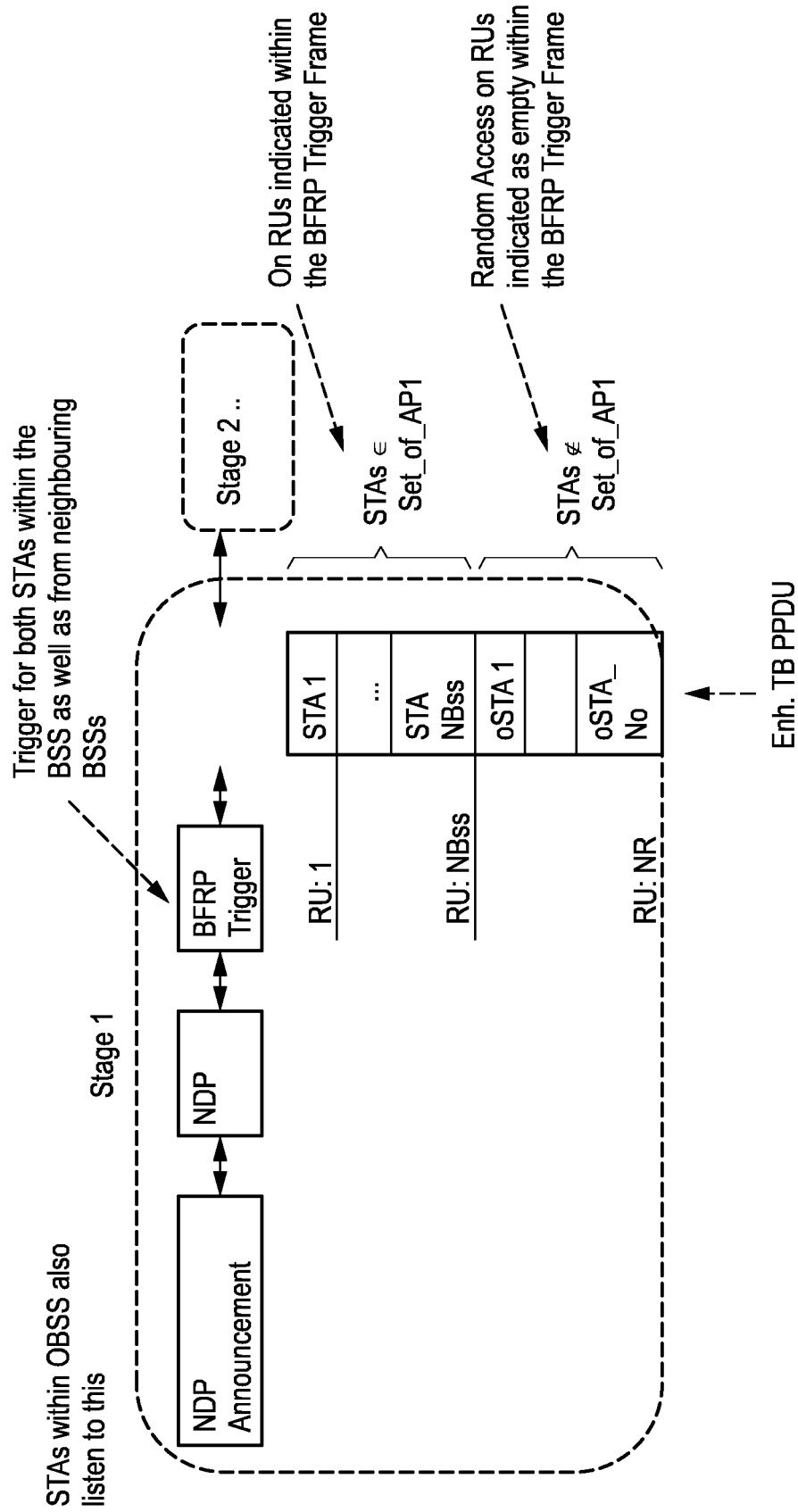
FIG. 3 shows a schematic diagram illustrating an embodiment of enhanced sounding for obtaining sounding information from STAs and sounding or identification information from oSTAs.
Figure 4:
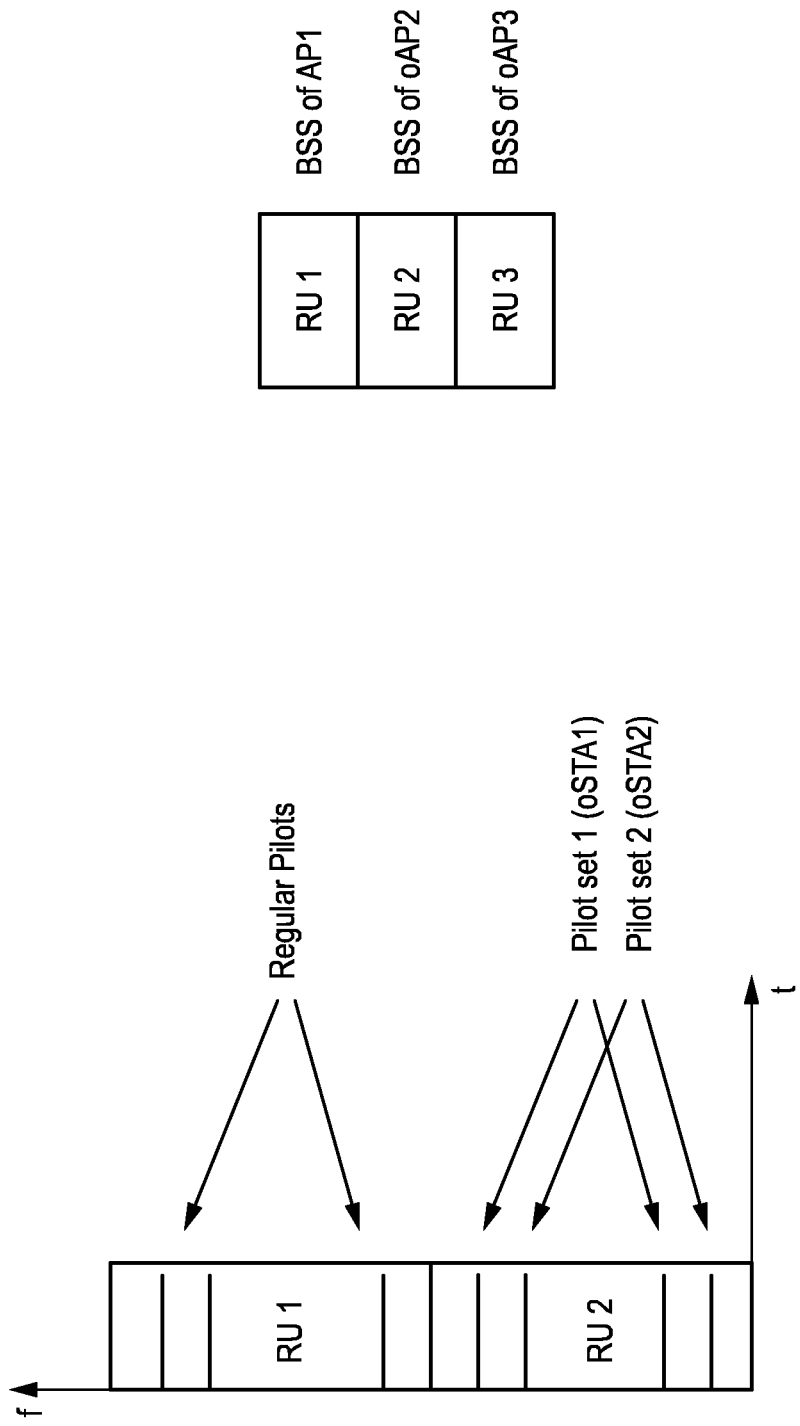
FIG. 4A shows a trigger-based PPDU structure as response to a beamforming trigger frame for feedback and identification.
FIG. 4B shows a more general form of a trigger-based PPDU.

An approach to allow simultaneously gathering of feedback information from the STAs as well as identification or sounding from the oSTAs is based on enhancing a DL sounding procedure. This approach is depicted in FIG. 3, which will be explained in more detail below. An alternative approach for the case, when identification information for oSTA which need to access the channel in an SR manner is already available, is depicted in FIG. 4. The approaches illustrated in FIGS. 3 and 4 are mostly appropriate when oSTAs have only one UL stream. When oSTAs have multiple streams, the approach may be applicable when a priori information regarding the number of streams to be used in UL is available at the AP. The latter could then include the information in a modified null data packet (NDP) announcement. Based on this the STAs can choose appropriate transmission parameters in the trigger based (TB) physical protocol data unit (PPDU), such that the packet can be correctly decoded at the AP.

Figure 7:
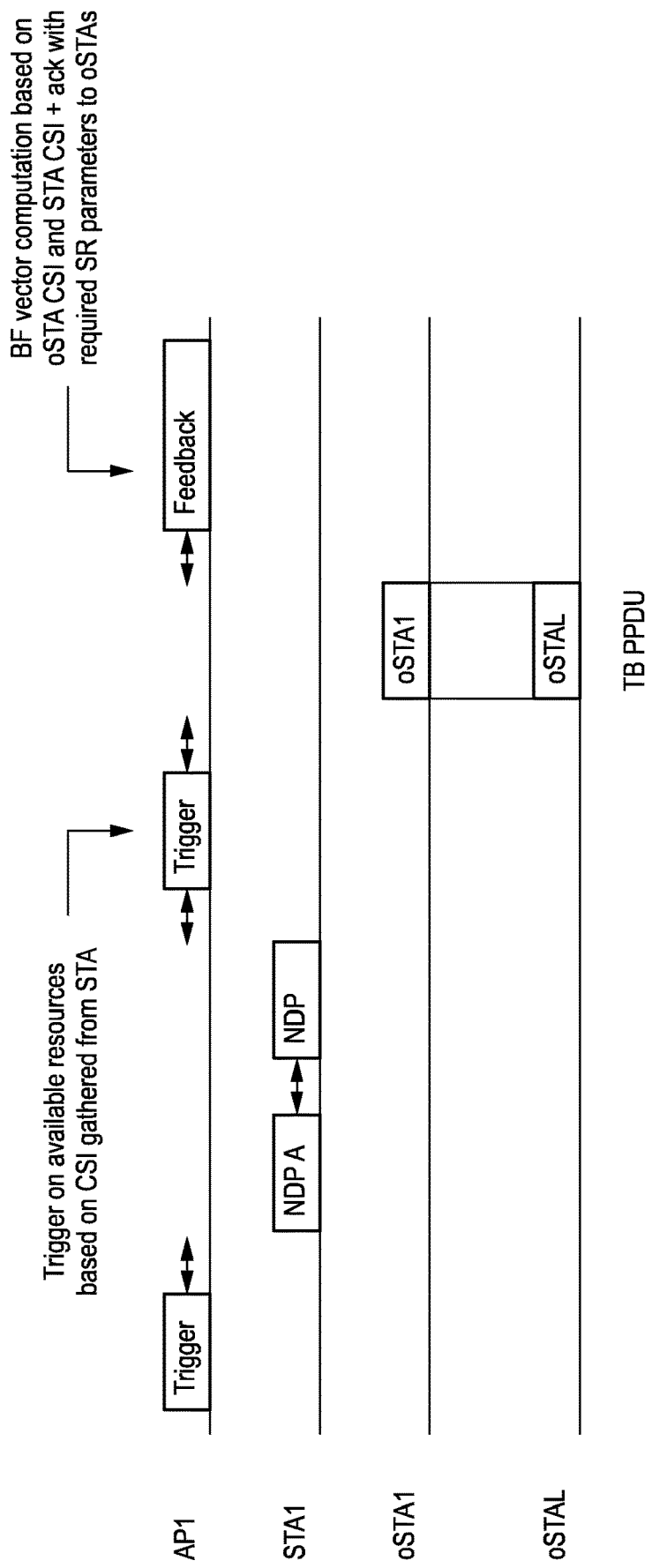
FIG. 7 shows a schematic diagram illustrating another embodiment of enhanced sounding with UL nulling information gathering.

In an alternative approach for multiple stream UL, an uplink sounding procedure is performed to allow APs to estimate channel information according to the number of UL streams to be used by the STAs. It is illustrated in FIG. 7, which will be explained in more detail below, how to modify an uplink sounding to allow gathering of information about the oSTAs.

Furthermore, some enhanced acknowledgement, which can be used in one embodiment to inform the oSTAs that they can use the SR slot, is defined.

In another embodiment, identification of relevant oSTAs, which can send in a spatial reuse mode and have information to send, is applied.

According to one approach, a protocol is defined based on which feedback information from STAs as well as from identification or sounding information from oSTAs are gathered simultaneously. More specifically, it is proposed to modify the sounding procedure such that part of the resources are allocated for the STAs sending feedback, while the rest of the resources can only be accessed by oSTAs, under predefined conditions: For example, only oSTAs from clusters that are coordinated or only oSTAs which have urgent traffic requirements can respond or the behavior is allowed when a mapping of resource units to BSSs and of AID sets to pilot sets is known at the AP involved in the scheme and supported by a standard. In this case identification information from the oSTAs would be gathered during the feedback phase of the STAs and CSI information could be obtained in a second stage. In order to implement this approach, several existing frames could be modified, namely the Beamforming Report Poll (BFRP) Trigger Frame and the Trigger Based (TB) PPDU containing the feedback from the various STAs.

Another approach is based on NDP Feedback Report (NFRP) and TB NDP PPDUs. It works as follows. For each of a group of neighboring (and coordinated) APs a set of AID ranges and a set of pilot patterns corresponding to each AID is defined. This can be decided e.g. by a master AP within a multi-AP scenario. According to these AID ranges, if oSTAs have information to send and need to do this within an overlapped transmission, they send with one pilot pattern corresponding to the AID range of the AP to which it needs to transmit. Based on information gathered in this way, the sounding feedback can be obtained from both STAs and oSTAs, with the procedure described in FIG. 5.

In another embodiment triggering the UL transmission from STAs to AP and oSTAs to corresponding oAPs is applied. The trigger frame should be designed such that it enables addressing oSTAs as well as informing their corresponding oAPs of the expected transmission time of the oSTA. Further, the oSTAs shall be able to decode the RU allocation information in the trigger frame. Only specifically addressed oSTAs, respecting power control condition, can send to an AP that is not the transmitter of the trigger frame.

FIG. 3 shows a schematic diagram illustrating enhanced sounding for obtaining sounding information from STAs and sounding or identification information from oSTAs. In a first step an NDP announcement is sent by a master AP (in this case AP1) to allow STAs that it will serve as well as oSTAs and their corresponding APs to know the start of a channel sounding interval. The NDP is a PHY packet, which contains sufficient channel estimation sequences to allow all STAs to estimate the channel information for all streams to be used. This is then followed by transmitting a trigger requesting stations to transmit data units containing channel estimation sequences enabling channel estimation and/or channel feedback information. In a particular embodiment, a packet, called BFRP) Trigger, is transmitted, whose role is to trigger the STAs to transmit the estimated channel information. In order to gather not only the information from the STAs but also from potential oSTAs, it is proposed in an embodiment to define the BFRP trigger with a resource allocation comprising a first set of resource units reserved for STAs to be served by the AP, which initiated the sounding phase. STAs and oSTAs thus receive the trigger from the master AP, in response to which trigger they transmit channel estimation sequences enabling channel estimation and/or channel feedback information to the AP.

The remaining resource units can in one embodiment be allocated as follows. If the AP knows the exact oSTAs which require nulling, these will be directly triggered. For this purpose, a combination of AID and BSS color (i.e., an identifier of a BSS) may be used. The destination of the frames within the trigger may also be set such that the corresponding APs/BSSs as well as the AP that triggered the sounding procedure are informed that they should process the response frame and based on it estimate the channels and extract identification information.

If the AP does not know the oSTAs that require nulling, but knows a set of potential oSTAs that could access the channel, the trigger frame may contain a set of AIDs (and BSS identifiers) corresponding to these oSTAs and RUs in which STAs corresponding to these AIDs can respond. Upon receipt, the oSTAs which have information to send will respond within the allocated RU of the TB-PPDU with a pilot pattern corresponding to their AIDs. This is depicted in FIG. 4A showing a TB PPDU structure as response to a BFRP frame for feedback and identification, where for simplicity only one STA is allocated to respond to the AP on RU1 while RU2 is allocated for valid oSTAs (belonging to the one overlapping BSS, and whose identifier has been signaled in the BFRP trigger). The STA1 replies within its dedicated RU with requested channel feedback information, in a required format. Each of the oSTAs replies within RU2, however with a different pilot pattern.

Upon receipt, the AP detects oSTA activity on RU2, thus knows it should obtain channel and transmission information from the oSTAs, to decide if nulling is possible and with which parameters. Furthermore, due to the different pilot structures, it can identify AIDs of the oSTAs. It thus has the necessary information to specifically trigger the oSTAs and thus request them to transmit data units allowing channel estimation. The triggering of the oSTAs occurs in a subsequent stage, which comprises the step of triggering detected oSTAs to transmit NDP packets on specific frequency resources, based on which AP1 and oAP1 estimate the uplink channels and determine the need and feasibility of spatial reuse.

The master AP can thus determine channel information based on channel estimation sequences and/or the channel feedback information transmitted from one or more of said STAs and from one or more of said oSTAs. Optionally, the master AP can identify if there is a second station desiring to make use of spatial reuse by receiving, from the second station, channel estimation sequences and identification information or channel estimation sequences sent with a pilot pattern which corresponds to an identifier known by the first access point to which it needs to transmit data. This identification information can be sent by the oSTAs at the same time as channel feedback information from the first STAs.

Further, the master AP can determine, based on the determined channel information, spatial reuse parameters for use by the first access point for reception of data during spatial reuse of resources, which are allocated to one or more of said first stations for transmission of data to the first access point, by one or more of said second stations for transmission of data to the second access point. In an embodiment, the master AP may determine if and for which one or more stations (e.g. the stations that replied to the trigger), spatial reuse is possible and with which parameters spatial reuse is possible. The information to determine if SR is possible or not may rely on older information, e.g. previous trigger or on no information.

What the second access points shall provide mostly is the identification information to let the master AP know which oSTAs may need to access the channel in the SR fashion for example due to low latency traffic requirements. The SR feasibility can be reported to the master AP, but can also be directly transmitted to second stations. One option is that the second access point transmits directly to the identified second station SR parameters in the form of a power limit. Second stations may then decide based on power limits received from the master access point and the second access point if they can transmit in SR fashion, instead of transmitting directly to the master access point the SR feasibility and parameters.

Furthermore, an acknowledgement regarding feasibility of uplink spatial reuse and updated power levels to be used are sent in a modified Ack frame. If no activity is detected on RUs other than RU1, the AP only sends an acknowledgement to the STA, that feedback information has been correctly received, and this ends the sounding procedure without requiring additional air time reservation. Depending on the RU used, the BSS can be identified.

FIG. 4B shows a more general form of a TB PPDU. Within one group of RUs only oSTAs from one BSS should be allowed in order to facilitate detection. Within each of the RUs, multiple oSTAs may reply with pilot patterns as shown in FIG. 4A. Based on pilot pattern and RU, the master AP can identify which oSTA of which BSS requires channel access or uplink transmission within a certain time interval and decide if spatial reuse may be required or feasible.

If the AP does not have any information about the oSTAs that require nulling, it may advertise random resources within the available resource units. oSTAs that require nulling (and are within the coordination set of the AP) can reply according to contention rules. Alternatively, a set of interlaced pilot sets or patterns can be defined, each corresponding to a possible AID. A STA requiring nulling randomly chooses one of the pilot patterns and uses it when responding within the resource unit. If the AP detects activity on one or more of the random resource units, it will have a separate trigger frame after the TB PPDU to explicitly gather more information about the STAs. Otherwise, it will acknowledge the reception of the feedback from its own STAs and terminate the sounding procedure.

Figure 5:
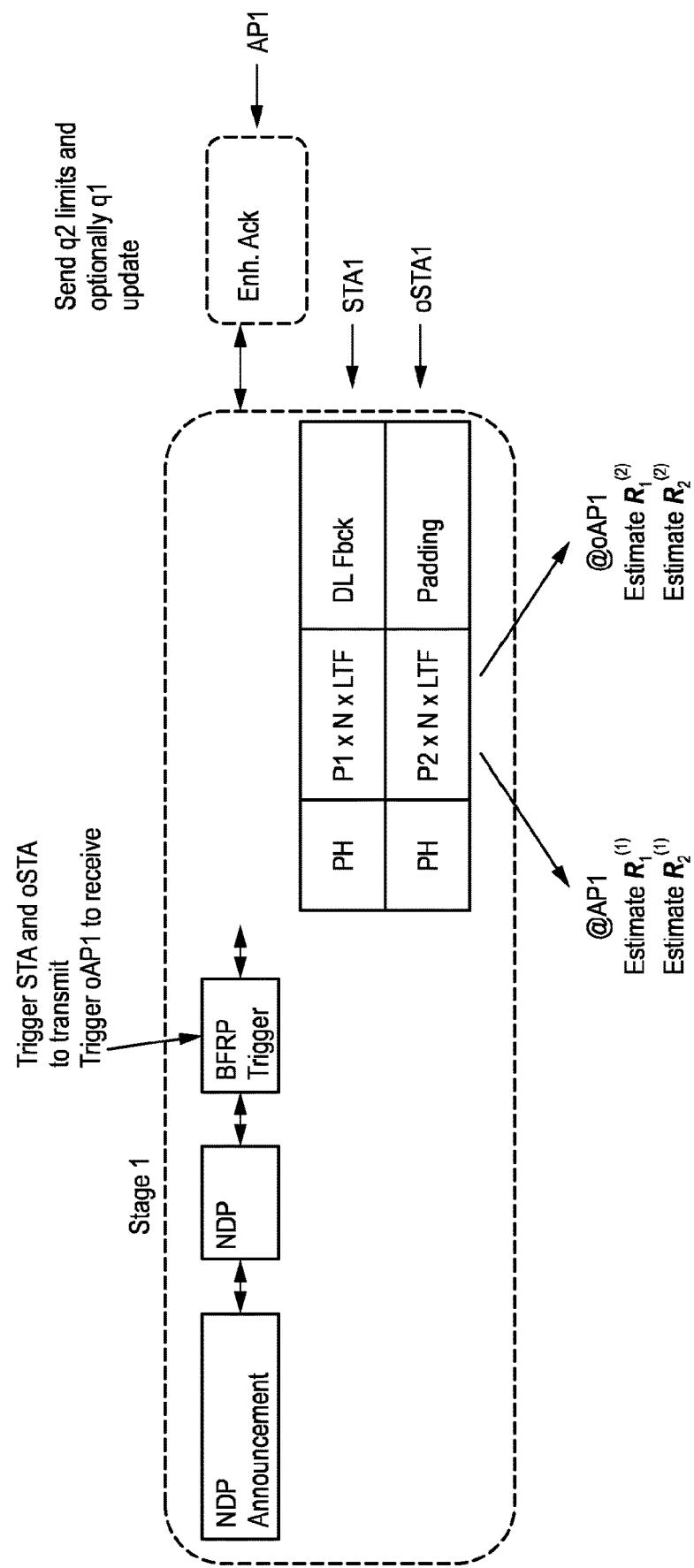
FIG. 5 shows a schematic diagram illustrating another embodiment of enhanced sounding when oSTAs are known.

If the oSTAs are known, a more efficient method than explained above with reference to FIG. 3, can be designed as depicted in FIG. 5. In this case, STA1 and oSTA1 are both sending the TB PPDU over the entire bandwidth or over a desired part of a bandwidth i.e., within a resource unit with the same time and frequency parameters for both STA1 and oSTA1, however with orthogonal channel estimation sequences. Due to their orthogonality, both the channels from STA1 $R_1^{(1)}$, $R_1^{(2)}$ and oSTA1 $R_1^{(1)}$, $R_2^{(2)}$ can be estimated. Finally, STA1 attaches to the packet its DL feedback. oSTA1 sends no further data, but only padding information. Furthermore, an enhanced Ack is the depicted, which is defined to address both STA1 and oSTA1, and to inform these of the feasibility of the spatial reuse in uplink and/or of updated power information to be used during the uplink transmission. Feasibility can be defined implicitly by the power information, e.g., a power information of 0 for the oSTA1 would implicitly indicate infeasibility of the spatial reuse.

Figure 6A:
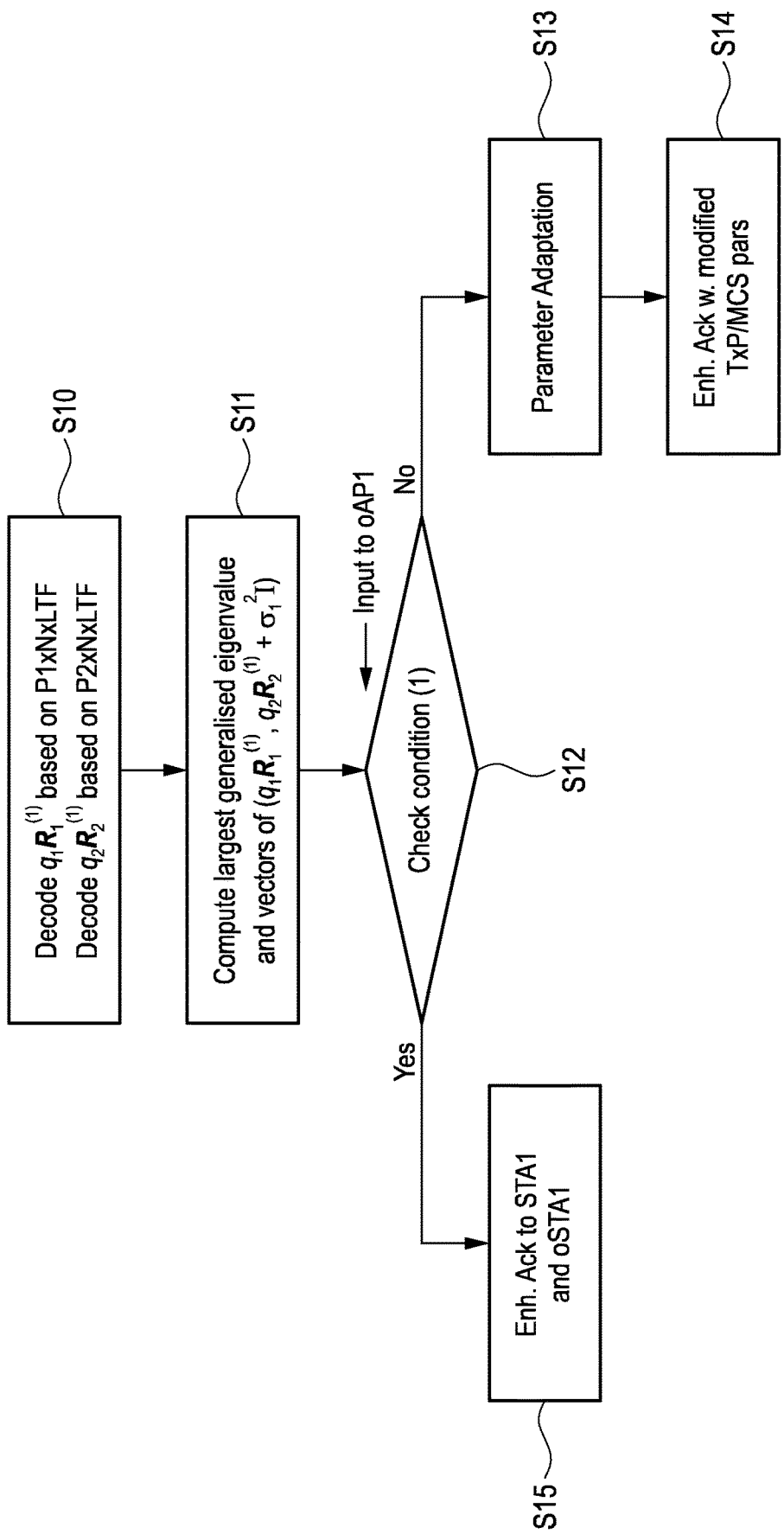
FIG. 6A shows a flow chart of an embodiment of the processing of a first AP.
Figure 6B:
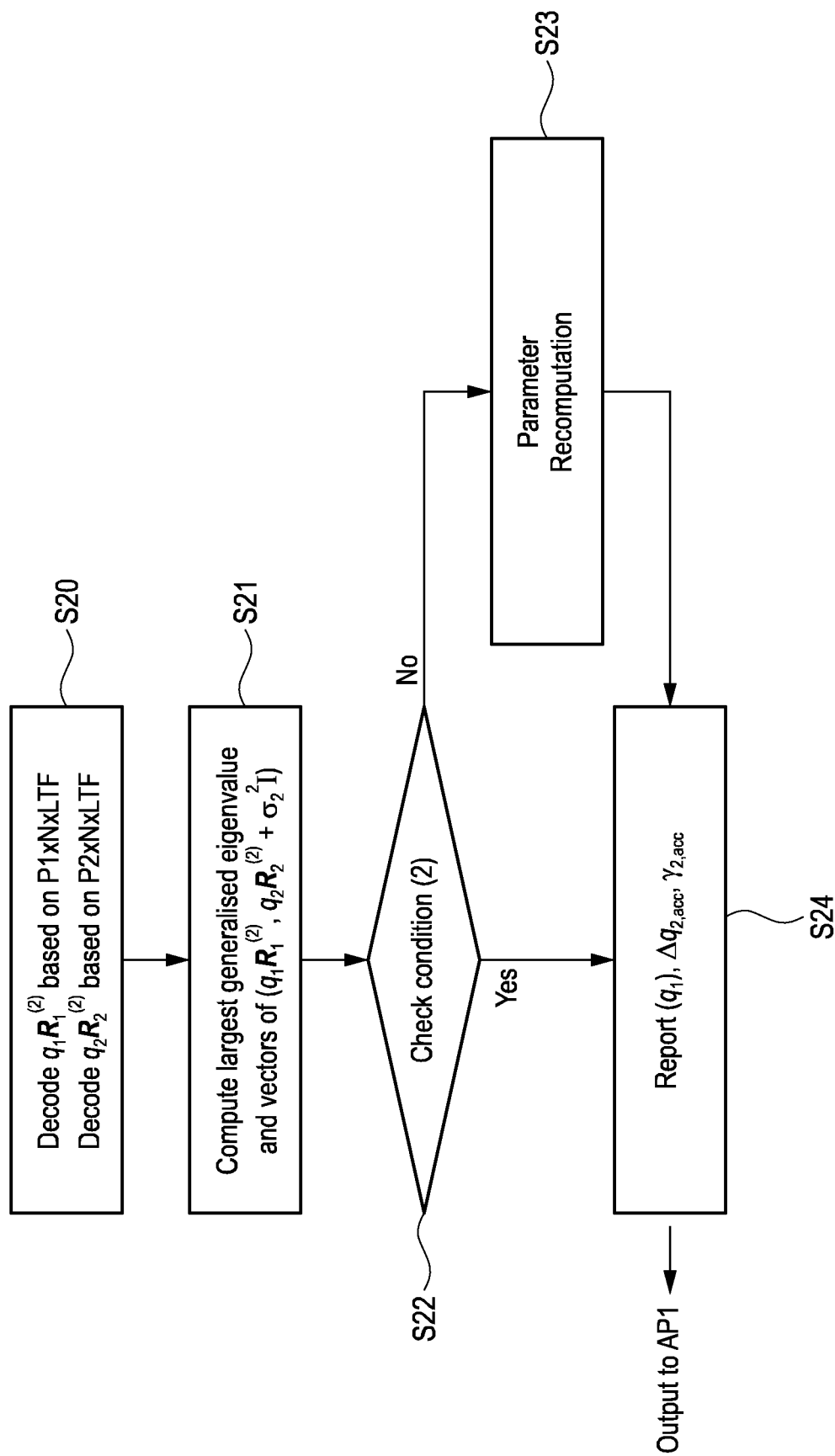
FIG. 6B shows a flow chart of an embodiment of the processing of a second AP.

With the SR criterion description provided above and the frame and protocol description provided in FIG. 5, the processing steps at AP1 and oAP1 after receiving the TB PPDU are summarized in the flow charts shown in FIG. 6A (for AP1) and FIG. 6B (for oAP1).

In a first step S10 of the processing of AP1 $q1R_1^{(1)}$ is decoded based on P1×NxLTF and $q2R_2^{(1)}$ is decoded based on P2×NxLTF. In these representations, LTF represents a common estimation unit for one stream or RF chain, NxLTF is an N repetition to allow estimation from multiple RF chains to be performed, while P1 and P2 represent matrices to ensure the orthogonality of the estimation sequences, in order to differentiate between the various RF chains and users participating in the transmission. In a second step S11 the largest generalized eigenvalue and vectors of $(q1R_2^{(1)}, q2R_2^{(1)}+\sigma_1^2I)$ are computed, where I denotes an identity matrix of appropriate dimensions. In a third step S12 it is checked if the above-mentioned condition (1) is satisfied.

If the condition in (1) at AP1 is not satisfied for the employed transmit powers, a parameter adaptation function is computed in step S13. An example of a parameter adaptation at AP1 is that for fixed q1 the largest q2, for which the condition in (1) is satisfied, is computed, or a lower MCS target $\gamma_1$ is considered and the largest q2, for which the condition in (1) with a new target is satisfied, is computed. In step S14, an enhanced Ack with modified TxP/MCS parameters is assembled and then transmitted. If the condition in (1) at AP1 is satisfied for the employed transmit powers, in step S15 an enhanced Ack is transmitted to STA and oSTA. The Ack is referred to as "enhanced" because it addresses simultaneously STAs, which are directly associated to the AP as well as oSTAs, from overlapping cells. Furthermore, spatial reuse related parameters such as individual transmit power and/or transmit power limits, which STAs and oSTAs would share resources and which resource units would be shared, are not supported by existing Ack frames, but should be supported for the schemes disclosed herein. For these reasons the Ack as enhanced Ack.

Thus, the STAs and oSTAs may receive, from AP1 or oPA1, an individual transmit power level or individual transmit power limit. Further, they may receive, from AP1, resource allocation information indicating resource units allocated for spatial reuse so that the oSTAs can transmit data, using the allocated resource units and the received individual transmit power level or a transmit power level equal to or lower than the received individual transmit power limit, during spatial reuse of resources allocated by AP1 to one or more of said STAs for transmission of data to AP1.

Regarding the processing at oAP1, described in FIG. 6B, after receiving a trigger from AP1 to start estimating a channel between the oAP1 and one or more STAs associated with AP1 and/or one or more oSTAs, in a first step S20 $q1R_1^{(2)}$ is decoded based on P1×NxLTF and $q2R_2^{(2)}$ is decoded based on P2×NxLTF. In a second step S21 the largest generalized) eigenvalue and vectors of $(q1R_2^{(2)}, q2R_2^{(2)}+\sigma_2^2I)$ are computed. In a third step S22 it is checked if the above-mentioned condition (2) is satisfied.

If the condition in (2) at oAP1 is not satisfied for the employed transmit powers, a recommendation is computed in step S23. Some examples of parameter recommendation at oAP1 are as follows. For fixed q1 the largest tolerable limit $\gamma_{2,cc}$, for which the condition in (2) is satisfied, is computed. Alternatively, a q1 recommendation, for which SR is possible, is computed. Another option is to determine a power recommendation for the oSTA1 e.g., in the form of the amount of power that should be reduced or increased in the transmission of oSTA2 in order to satisfy the criterion (2). In step S24, one or more of the adapted parameters mentioned above (q1), $\Delta q_{2,acc}$, $\gamma_{2,cc}$ are reported. If the condition in (2) at oAP1 is satisfied for the employed transmit powers, step S24 is directly executed.

Thus, the oAP1 can determine channel information based on data units transmitted from one or more of said STAs and oSTAs, said data units containing channel estimation sequences enabling channel estimation and/or channel feedback information. Further, the oAP1 can identify one or more oSTAs using resource units allocated for spatial reuse and/or random access by the AP1 and transmit identification information to the AP1 indicating if and/or for which one or more oSTAs spatial reuse is possible or considered.

As mentioned above, AP1 requires input from oAP1, which should include a list of identifiers of oSTAs, which may need to be considered during the SR training and SR operation and optionally spatial reuse parameters, feasibility and power recommendations. The input from oAP1 can either be within a wired backhaul or within a wireless backhaul. In the latter case, the AP1 sends a trigger to the oAPs, whose oSTAs are participating in the SR training, to obtain the list of parameters.

In another embodiment, different from the embodiment illustrated above with reference to FIGS. 3 and 5, the oSTAs, which have information to send and may require nulling, can be identified in a dedicated stage, independent of the sounding for STA feedback, by using a modified version of an NDP feedback report. Initially, the NDP feedback report has been defined to gather information about STAs, within the BSS, that have information in their queue and need to be triggered. However, this can be modified to allow an AP to gather information of oSTAs that require overlapped transmissions. For this, NFRP trigger can be modified to contain several AID sets for STAs associated to neighboring APs: AID Set 1 for oAP1, AID set 2 for oAP2. For each AID, a pilot pattern is defined to be used in the following TB NDP feedback. The addressing of the NFRP trigger may also be modified to enable oAPs to identify themselves as recipients and synchronize their reception to the transmission of the subsequent TB NDP from the oSTAs. After identifying the STAs that require UL nulling, these can be specifically triggered to obtain channel information during the NDP sounding as described above or in a separate stage.

In the following an embodiment using multiple streams operation will be described. In this embodiment the following scenario shall be considered: one STA that is only SU-MIMO capable and an AP having a number of antennas larger than the number of antennas at the STA. In this case, the AP can use the additional degrees of freedom to allow oSTAs to access the same RUs as the STA.

Within the SU MIMO sounding procedure, when the beamformer is a non-AP STA for the UL MIMO, the sounding should again comprise of an NDP announcement (NDP-A), which contains information about the number of streams for which feedback is requested. NDP-A as well as NDP should be received not only by the STAs associated to the AP1 and scheduled to participate in the sounding, but also by oSTAs and corresponding oAPs. Currently, non-AP STAs are not allowed to send trigger frames. Thus, the SU MIMO sounding may be preceded when the STA is a non-AP STA by a trigger from the master AP (AP1), which announces the start of an SU-MIMO sounding with SR opportunity. The rest of the procedure is depicted in FIG. 7 showing a diagram illustrating SU MIMO uplink sounding with Spatial Reuse Phase for non-AP STAs. After the NDP, containing the channel estimation sequences based on which $R_1^{(1)}$, $R_1^{(1)}$ can be estimated, a trigger frame is sent. The goal of this is to trigger potential oSTAs to signal their need to participate in a follow-up uplink transmission as well as to allow the APs and corresponding oAPs to estimate the channels between these oSTAs and themselves, i.e., $R_2^{(1)}$, $R_2^{(2)}$ in this example.

The feedback contains the updated uplink beamforming vector information, as should be used by the STA, when transmitting to the AP. Furthermore, as additional to the feedback information to the STAs, spatial reuse specific parameters can be transmitted to the oSTAs such as a confirmation to the oSTAs, which can share RUs with the STA, together with information on maximum allowed transmit power, allocation IDs and possibly schedule, if known.

Based on oSTA channel and traffic information, the AP can limit the number of UL streams of its associated STA in order to ensure an UL SR transmission for oSTAs under specific conditions, e.g. if these have high priority traffic. Such a modification is then also notified within the feedback frame.

Similar to the previous cases, if oSTAs are known they can be informed which channel estimation sequences to use, in which case the channels from multiple oSTAs can be estimated simultaneously. If the oSTAs are not known, then a similar method of addressing BSS colors and AID sets as described in the case of BFRP Trigger and NFRP Trigger as well as in FIG. 5 can be applied. The feedback may be preceded by an information exchange between AP and oAPs involved, in order for the former to obtain SR feasibility and parameter updates from the latter, as discussed above for the case of DL sounding with SR. If this is done in the same bands, a trigger and trigger based PPDU response precedes the feedback transmission. This exchange can, however, be performed via wireline backhaul or wireless over a different band than the rest of the procedure, for which reason it is not shown in FIG. 7.

Figure 8:
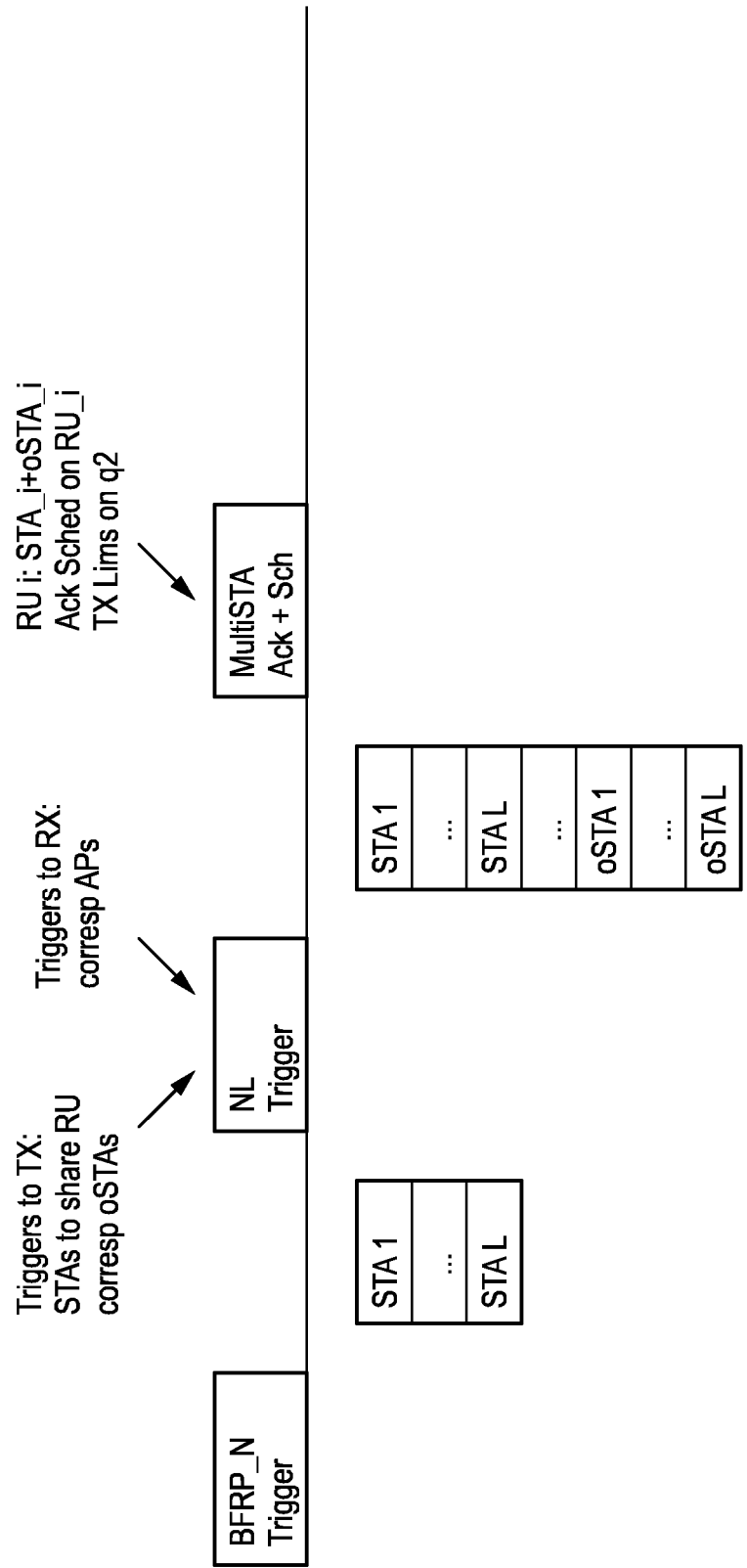
FIG. 8 shows a schematic diagram illustrating still another embodiment of enhanced sounding.

FIG. 8 shows a schematic diagram illustrating still another embodiment of enhanced sounding. In this embodiment, it is assumed that oSTA information (AID and BSS identification, latency traffic type requirements) has been gathered in a phase preceding the sounding phase. In this case the AP starts the sounding phase for its associated STAs. After obtaining channel information from the requested STAs, based on requirements of STAs and oSTAs, the AP decides which pairs of STAs and oSTAs should train together i.e., send data units with channel estimation sequences within the same frequency segment and time intervals. These STAs and oSTAs are triggered to transmit the packets as described, and the oAPs are triggered to estimate the channels of the respective pairs and compute the SR criteria. The final feedback or multi STA Ack contains information regarding the SR parameters i.e., transmit powers and SR feasibility.

Figure 9:
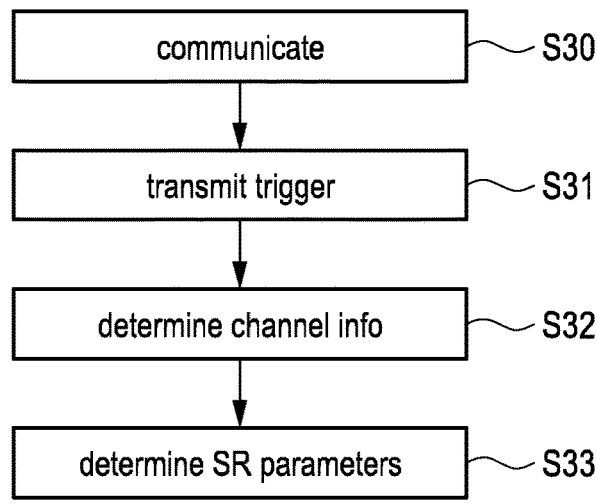
FIG. 9 shows a flow chart of a method for use by the first access point.

FIG. 9 shows a flow chart of a method for use by a first access point. The method may be performed by circuitry (e.g. a processor or computer) of the first access point and comprises the following steps:
  communicating with one or more first stations associated with the first access point (step S30),
  transmitting a trigger requesting stations to transmit data units containing channel estimation sequences enabling channel estimation and/or channel feedback information (step S31),
  determining channel information based on channel estimation sequences and/or the channel feedback information transmitted from one or more of said first stations and from one or more second stations associated with a second access point (step S32), and
  determining, based on the determined channel information, spatial reuse parameters for use by the first access point for reception of data during spatial reuse of resources allocated to one or more of said first stations for transmission of data to the first access point by one or more of said second stations for transmission of data to the second access point (step S33).

Figure 10:
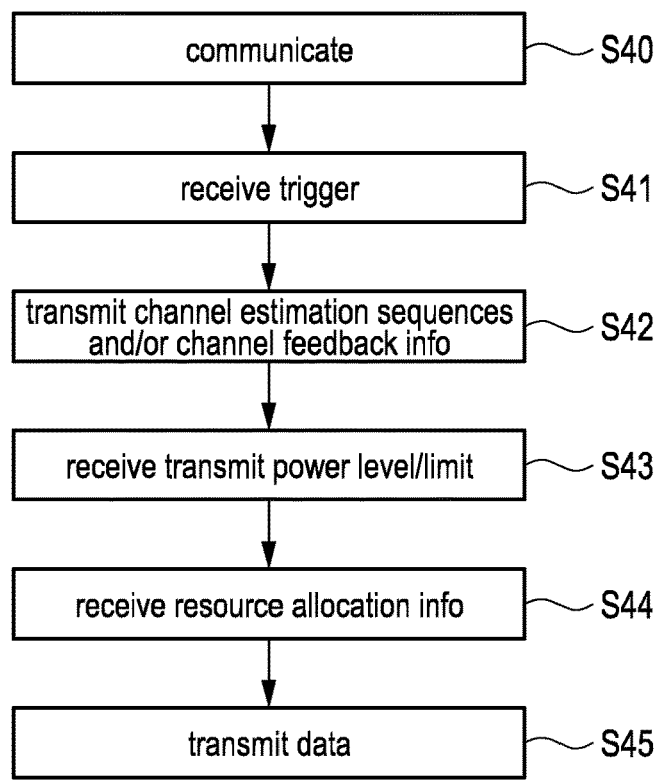
FIG. 10 shows a flow chart of a method for use by a second station.

FIG. 10 shows a flow chart of a method for use by a second station. The method may be performed by circuitry (e.g. a processor or computer) of the second station and comprises the following steps:
  communicating with an associated second access point (step S40),
  receiving a trigger from a first access point to which one or more first stations are associated, the trigger requesting stations to transmit data units containing channel estimation sequences enabling channel estimation and/or channel feedback information (step S41),
  transmitting channel estimation sequences enabling channel estimation and/or channel feedback information to the first access point (step S42),
  receiving, from the second access point or the first access point, an individual transmit power level or individual transmit power limit (step S43),
  receiving, from the first access point, resource allocation information indicating resource units allocated to the second station for spatial reuse (step S44), and
  transmitting data, using the allocated resource units and the received individual transmit power level or a transmit power level equal to or lower than the received individual transmit power limit, during spatial reuse of resources allocated by the first access point to one or more of said first stations for transmission of data to the first access point (step S45).

Figure 11:
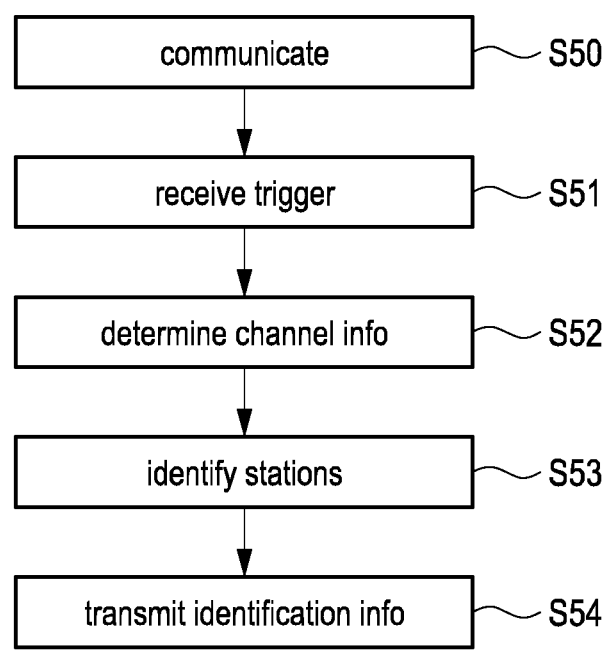
FIG. 11 shows a flow chart of a method for use by a second access point.

FIG. 11 shows a flow chart of a method for use by a second access point. The method may be performed by circuitry (e.g. a processor or computer) of the second access point and comprises the following steps:
  communicating with one or more second stations associated with the second access point (step S50), receiving a trigger from a first access point to start estimating a channel between the second access point and one or more first stations associated with the first access point and/or one or more second stations (step S51), determining channel information based on data units transmitted from one or more of said first and second stations, said data units containing channel estimation sequences enabling channel estimation and/or channel feedback information (step S52), identifying one or more second stations using resource units allocated for spatial reuse and/or random access by the first access point (step S53), and transmitting identification information to the first access point indicating if and/or for which one or more second stations spatial reuse is possible or considered (step S54).

According to the present disclosure a number of new elements are thus presented as will be briefly summarized in the following.

The first access point (AP) may particularly be configured to perform one or more of the following functions:

It may identify a set of STAs that can transmit to different APs than itself on a particular resource unit.

It may trigger simultaneously a STA to transmit data on the particular resource unit and one or more STAs to transmit data on the same resource unit but to one or more different AP(s).

It may identify the (known and unknown, i.e. specifically addressed oSTAs or oSTAs from a specifically addressed set of STAs) oSTAs, which can share a spatial reuse resource unit with own STA, based on a criterion depending on the receive beamforming capabilities at the AP and the QoS requirements of the STA that transmits to the AP.

It may address the one or more overlapping STAs specifically that they can transmit during the SR to an oAP.

It may address a set of one or more overlapping STAs that can transmit during the SR to allow one of the oSTAs in the set to transmit. Furthermore, it may advertise the spatial reuse parameters that the oSTAs should use in their transmission.

It may send a beamforming trigger, in which several of the resources are allocated to its associated STA, allowing it to send BF feedback, and the rest of the resources are unallocated or allocated in broadcast mode to STAs in overlapping BSSs. This allows STAs from overlapping BSSs to indicate that they need to be triggered to which the overlapping STAs access the random resources in a contention manner and/or to which the overlapping STAs respond with a pilot pattern, belonging to a set, specific to the AID and BSS combination.

It may simultaneously gather information about overlapping STAs which need to transmit and beamforming feedback of its associated STAs.

It may trigger oSTAs to send NDP packets to AP and corresponding oAPs, in order to gather channel information.

It may simultaneously estimate the channels from one STA and one oSTA, on one resource unit.

It may allocate RUs in an NFRP trigger to different oBSSs, to which the overlapping STAs respond with a pilot pattern belonging to a set specific to the AID and BSS combination. The mapping between the pilot patterns and the AIDs could be defined in a standard and be known at the APs or could be chosen by the AP and be advertised to all APs and STAs, participating in the SR training.

Based on a fixed uplink power level from a STA and channel information from STA and oSTA, it may design receive beamformers as generalized eigenvectors and decide about uplink power limitation, which can be used by oSTA in a spatial reuse uplink slot.

It may adapt the uplink transmit power of a STA to allow spatial reuse with a specific oSTA.

The second access point (oAP) may be particularly configured to perform one or more of the following functions:

It may compute an SR feasibility criterion based on channel information, its own receive beamforming capabilities and a fixed uplink power from a STA.

It may send a recommendation for power update of a STA to allow SR for its associated oSTA.

It may send an AID set of its associated oSTAs to the AP such that the latter is able to identify oSTAs.

It may start reception from STAs and oSTAs within an IFS from the reception of a trigger frame.

In summary, an approach is presented by which an AP can identify and trigger stations with stringent latency requirements or with periodic traffic to transmit to their corresponding APs, simultaneously with uplink traffic from its own service set. The existing spatial reuse may be improved to take into account receive beamforming capabilities at the APs. Furthermore, an approach is presented to gather the channel information in an efficient manner and enhance the triggering procedures to allow stations from overlapping cells to access the channel, during the transmit opportunities or resource units allocated to other users.

Thus, the present disclosure provides one or more of the following advantages. The chances for STAs within overlapping BSSs to access the channel during the uplink resource units allocated to specific STAs may be increased, spatial reuse may be allowed in uplink even if not enough degrees of freedom are available in downlink, and a reduced training overhead is required due to integration of overlapping STA identification in sounding stages of the BSSs.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further, a circuit includes central processing units, graphics processing units, and microprocessors, which are programmed or configured according to software code. A circuit does not include pure software, although a circuit includes the above-described hardware executing software.

It follows a list of further embodiments of the disclosed subject matter:

1. First access point comprising circuitry configured to
   communicate with one or more first stations associated with the first access point,
   transmit a trigger requesting stations to transmit data units containing channel estimation sequences enabling channel estimation and/or channel feedback information,
   determine channel information based on channel estimation sequences and/or the channel feedback information transmitted from one or more of said first stations and from one or more second stations associated with a second access point, and
   determine, based on the determined channel information, spatial reuse parameters for use by the first access point for reception of data during spatial reuse of resources allocated to one or more of said first stations for transmission of data to the first access point by one or more of said second stations for transmission of data to the second access point.

2. First access point as defined in embodiment 1, wherein the circuitry is configured to determine the spatial reuse parameters ensuring that a signal to interference ratio or a signal to interference plus noise ratio at the first access point is above a threshold or that a signal to interference condition or a signal to interference plus noise condition is fulfilled during the spatial reuse.

3. First access point as defined in any preceding embodiment, wherein the circuitry is configured to determine, as spatial reuse parameter, beamforming vectors defining a beamforming configuration used by the first access point for receiving data transmitted by one or more of said first stations during spatial reuse.

4. First access point as defined in embodiment 3, wherein the circuitry is configured to determine the beamforming vectors by solving a generalized eigenvector or singular vector problem.

5. First access point as defined in any preceding embodiment, wherein the circuitry is configured to determine, as spatial reuse parameter, resource allocation information indicating the time and frequency allocation of resources to one or more of said second stations for transmission of data to the second access point and/or spatial reuse feasibility information indicating the feasibility of spatial reuse.

6. First access point as defined in any preceding embodiment, wherein the circuitry is configured to determine, as spatial reuse parameter, individual transmit power levels and/or transmit power limits for use by the one or more first stations and the one or more second stations for transmitting data during the spatial reuse.

7. First access point as defined in any preceding embodiment, wherein the circuitry is configured to adjust one or more of the determined individual transmit power levels by using feedback from the second access point indicating if it is able to receive data transmitted from the one or more second stations with a desired quality or making recommendations for spatial reuse parameters to be used in order to ensure reception of data transmission from one or more second stations with a desired quality.

8. First access point as defined in any preceding embodiment, wherein the circuitry is configured to notify the first and second stations of one or more of
   individual transmit power levels for use by one or more of said second stations for transmission of data to the second access point,
   an identifier of second stations that are allowed to reuse resources allocated to one or more first stations,
   time and frequency information of resource units that can be used by the respective first and/or second stations.

9. First access point as defined in any preceding embodiment, wherein the circuitry is configured to identify if there is a second station and/or which second station is desiring to make use of spatial reuse by receiving, from the second station, channel estimation sequences and identification information in resource units allocated for random access or spatial reuse or by receiving channel estimation sequences sent with a pilot pattern which corresponds to an identifier of the second station.

10. First access point as defined in any preceding embodiment, wherein the circuitry is configured to transmit an announcement to inform the first and second stations and the second access point of the start of a channel sounding interval, which contains a spatial reuse stage, and/or to transmit channel estimation sequences allowing the first and second stations to estimate the channel information and receive channel feedback information from the first and/or second stations.

11. First access point as defined in embodiment 10, wherein the circuitry is configured to perform, in the spatial reuse stage, a triggered transmission with at least one resource allocated such that known or unknown second stations can transmit and the access points can estimate the channels from the second stations.

12. First access point as defined in any preceding embodiment, wherein the circuitry is configured to transmit information, included in the trigger, indicating which channel estimation sequences, among a set of orthogonal channel estimation sequences, should be used for transmission by the first and second stations and to receive data units with first channel estimation sequences from a first station that are orthogonal to the channel estimation sequences received from a second station.

13. First access point as defined in any preceding embodiment, wherein the circuitry is configured to transmit allocation information indicating one or more of:
   first resource units allocated to one or more first stations to transmit channel information or channel estimation sequences,
   second resource units allocated to one or more second station to transmit indication that they shall perform spatial reuse or they shall transmit channel estimation sequences,
   third resource units allocated to a specifically addressed set of one or more second stations, from which only the ones that need to access a channel within a given time interval, and may require a spatial reuse mode, shall respond.

14. First access point as defined in any preceding embodiment, wherein the circuitry is configured to transmit to the second access point one or more of
- a request to estimate the channel between the second access point and first and second stations, and
- a request to transmit information if one or more second stations require spatial reuse and to transmit identification information identifying the one or more second stations requiring spatial reuse.

15. First access point as defined in any preceding embodiment, wherein the circuitry is configured to determine if and for which one or more stations spatial reuse is possible and with which parameters spatial reuse is possible.

16. Second station comprising circuitry configured to
- communicate with an associated second access point,
- receive a trigger from a first access point to which one or more first stations are associated, the trigger requesting stations to transmit data units containing channel estimation sequences enabling channel estimation and/or channel feedback information,
- transmit channel estimation sequences enabling channel estimation and/or channel feedback information to the first access point,
- receive, from the second access point or the first access point, an individual transmit power level or individual transmit power limit,
- receive, from the first access point, resource allocation information indicating resource units allocated to the second station for spatial reuse, and
- transmit data, using the allocated resource units and the received individual transmit power level or a transmit power level equal to or lower than the received individual transmit power limit, during spatial reuse of resources allocated by the first access point to one or more of said first stations for transmission of data to the first access point.

17. Second station as defined in embodiment 16, wherein the circuitry is configured to simultaneously transmit channel information and identification information identifying the second station or to transmit with a pilot pattern corresponding to identification information.

18. Second station as defined in embodiment 16 or 17, wherein the circuitry is configured to receive an announcement from the first access point informing the second station of the start of a channel sounding interval allowing spatial reuse and/or to receive channel estimation sequences from the first access point allowing the second station to estimate the channel information for subsequent transmission of the estimated channel information to the first access point in response to the trigger.

19. Second station as defined in any one of embodiments 16 to 18, wherein the circuitry is configured to transmit a first channel estimation sequence to the first access point that is orthogonal to a channel estimation sequence transmitted by any other station.

20. Second station as defined in embodiment 19, wherein the circuitry is configured to derive information indicating which orthogonal channel estimation sequence to transmit from the trigger.

21. Second station as claimed in any one of embodiments 16 to 20, wherein the circuitry is configured receive allocation information indicating one or more first resource units allocated to one or more first stations and indicating one or more second resource units that are allocated to the second station or unallocated.

22. Second access point comprising circuitry configured to
- communicate with one or more second stations associated with the second access point,
- receive a trigger from a first access point to start estimating a channel between the second access point and one or more first stations associated with the first access point and/or one or more second stations,
- determine channel information based on data units transmitted from one or more of said first and second stations, said data units containing channel estimation sequences enabling channel estimation and/or channel feedback information,
- identify one or more second stations using resource units allocated for spatial reuse and/or random access by the first access point, and
- transmit identification information to the first access point indicating if and/or for which one or more second stations spatial reuse is possible or considered.

23. Second access point as defined in embodiment 22, wherein the circuitry is configured to transmit transmit power recommendations to the first access point indicating transmit powers recommended for use by the one or more second stations for which spatial reuse is possible.

24. Second access point as defined in embodiment 22 or 23, wherein the circuitry is configured to inform the one or more second stations for which spatial reuse is considered that they can participate in a spatial reuse sounding phase and/or that they can use spatial reuse and/or which pilot patterns they shall use and/or to transmit a set of identifiers to the second stations to let them know which pilot patterns to use.

25. Method for use by a first access point comprising
- communicating with one or more first stations associated with the first access point,
- transmitting a trigger requesting stations to transmit data units containing channel estimation sequences enabling channel estimation and/or channel feedback information,
- determining channel information based on channel estimation sequences and/or the channel feedback information transmitted from one or more of said first stations and from one or more second stations associated with a second access point, and
- determining, based on the determined channel information, spatial reuse parameters for use by the first access point for reception of data during spatial reuse of resources allocated to one or more of said first stations for transmission of data to the first access point by one or more of said second stations for transmission of data to the second access point.

26. Method for use by a second station comprising
- communicating with an associated second access point,
- receiving a trigger from a first access point to which one or more first stations are associated, the trigger requesting stations to transmit data units containing channel estimation sequences enabling channel estimation and/or channel feedback information,
- transmitting channel estimation sequences enabling channel estimation and/or channel feedback information to the first access point,
- receiving, from the second access point or the first access point, an individual transmit power level or individual transmit power limit,
- receiving, from the first access point, resource allocation information indicating resource units allocated to the second station for spatial reuse, and
- transmitting data, using the allocated resource units and the received individual transmit power level or a transmit power level equal to or lower than the received individual transmit power limit, during spatial reuse of resources allocated by the first access point to one or more of said first stations for transmission of data to the first access point.

27. Method for use by a second access point comprising
communicating with one or more second stations associated with the second access point,
receiving a trigger from a first access point to start estimating a channel between the second access point and one or more first stations associated with the first access point and/or one or more second stations,
determining channel information based on data units transmitted from one or more of said first and second stations, said data units containing channel estimation sequences enabling channel estimation and/or channel feedback information,
identifying one or more second stations using resource units allocated for spatial reuse and/or random access by the first access point, and
transmitting identification information to the first access point indicating if and/or for which one or more second stations spatial reuse is possible or considered.

28. A non-transitory computer-readable recording medium that stores therein a computer program product, which, when executed by a processor, causes the method according to embodiment 26 or 27 to be performed.

29. A computer program comprising program code means for causing a computer to perform the steps of said method according to embodiment 26 or 27 when said computer program is carried out on a computer.

30. First access point comprising circuitry configured to
communicate with one or more first stations associated with the first access point, and
notify one or more second stations associated with a second access point that they are allowed to transmit data to the associated second access point during spatial reuse of resources allocated to one or more of said first stations for transmission of data to the first access point.

31. First access point according to embodiment 30, wherein the circuitry is configured to advertise spatial reuse parameters that the one or more notified second stations should use for transmitting data.

32. First access point according to embodiment 30 or 31, wherein the circuitry is further configured as defined in any one of embodiments 1 to 15.

33. Method for use by a first access point comprising
communicating with one or more first stations associated with the first access point, and
notifying one or more second stations associated with a second access point that they are allowed to transmit data to the associated second access point during spatial reuse of resources allocated to one or more of said first stations for transmission of data to the first access point.

The invention claimed is:

1. A first access point comprising circuitry configured to
communicate with one or more first stations associated with the first access point,
transmit a trigger requesting stations to transmit data units containing channel estimation sequences enabling channel estimation and/or channel feedback information,
determine channel information based on channel estimation sequences and/or the channel feedback information transmitted from one or more of said first stations and from one or more second stations associated with a second access point, and
determine, based on the determined channel information, spatial reuse parameters for use by the first access point for reception of data during spatial reuse of resources by (i) one or more of said first stations for transmission of data to the first access point and (ii) by one or more of said second stations for transmission of data to the second access point.

2. The first access point as claimed in claim 1,
wherein the circuitry is configured to determine the spatial reuse parameters ensuring that a signal to interference ratio or a signal to interference plus noise ratio at the first access point is above a threshold or that a signal to interference condition or a signal to interference plus noise condition is fulfilled during the spatial reuse.

3. The first access point as claimed in claim 1,
wherein the circuitry is configured to determine, as spatial reuse parameter, one or more of
beamforming vectors defining a beamforming configuration used by the first access point for receiving data transmitted by one or more of said first stations during spatial reuse,
resource allocation information indicating the time and frequency allocation of resources to one or more of said second stations for transmission of data to the second access point,
spatial reuse feasibility information indicating the feasibility of spatial reuse, and
individual transmit power levels and/or transmit power limits for use by the one or more first stations and the one or more second stations for transmitting data during the spatial reuse.

4. The first access point as claimed in claim 1,
wherein the circuitry is configured to notify the first and second stations of one or more of
individual transmit power levels for use by one or more of said second stations for transmission of data to the second access point,
an identifier of second stations that are allowed to reuse resources allocated to one or more first stations,
time and frequency information of resource units that can be used by the respective first and/or second stations.

5. The first access point as claimed in claim 1,
wherein the circuitry is configured to identify if there is a second station and/or which second station is desiring to make use of spatial reuse by receiving, from the second station, channel estimation sequences and identification information in resource units allocated for random access or spatial reuse or by receiving channel estimation sequences sent with a pilot pattern which corresponds to an identifier of the second station.

6. The first access point as claimed in claim 1,
wherein the circuitry is configured to transmit an announcement to inform the first and second stations and the second access point of the start of a channel sounding interval, which contains a spatial reuse stage, and/or to transmit channel estimation sequences allowing the first and second stations to estimate the channel information and receive channel feedback information from the first and/or second stations.

7. The first access point as claimed in claim 6,
wherein the circuitry is configured to perform, in the spatial reuse stage, a triggered transmission with at least one resource allocated such that known or unknown second stations can transmit and the access points can estimate the channels from the second stations.

8. The first access point as claimed in claim 1,
wherein the circuitry is configured to transmit information, included in the trigger, indicating which channel estimation sequences, among a set of orthogonal channel estimation sequences, should be used for transmission by the first and second stations and to receive data units with first channel estimation sequences from a first station that are orthogonal to the channel estimation sequences received from a second station.

9. The first access point as claimed in claim 1,
wherein the circuitry is configured to transmit allocation information indicating one or more of:
 first resource units allocated to one or more first stations to transmit channel information or channel estimation sequences,
 second resource units allocated to one or more second station to transmit indication that they shall perform spatial reuse or they shall transmit channel estimation sequences,
 third resource units allocated to a specifically addressed set of one or more second stations, from which only the ones that need to access a channel within a given time interval, and require a spatial reuse mode, shall respond.

10. The first access point as claimed in claim 1,
wherein the circuitry is configured to transmit to the second access point one or more of
 a request to estimate the channel between the second access point and first and second stations, and
 a request to transmit information if one or more second stations require spatial reuse and to transmit identification information identifying the one or more second stations requiring spatial reuse, and/or
wherein the circuitry is configured to determine if and for which one or more stations spatial reuse is possible and with which parameters spatial reuse is possible.

11. A second station comprising circuitry configured to
communicate with an associated second access point,
receive a trigger from a first access point to which one or more first stations are associated, the trigger requesting stations to transmit data units containing channel estimation sequences enabling channel estimation and/or channel feedback information,
transmit channel estimation sequences enabling channel estimation and/or channel feedback information to the first access point,
receive, from the second access point or the first access point, an individual transmit power level or individual transmit power limit,
receive, from the first access point, resource allocation information indicating resource units allocated to the second station for spatial reuse, and
transmit data, using the allocated resource units and the received individual transmit power level or a transmit power level equal to or lower than the received individual transmit power limit, during spatial reuse of resources allocated by the first access point to one or more of said first stations for transmission of data to the first access point.

12. The second station as claimed in claim 11,
wherein the circuitry is configured to simultaneously transmit channel information and identification information identifying the second station or to transmit with a pilot pattern corresponding to identification information.

13. The second station as claimed in claim 11,
wherein the circuitry is configured to receive an announcement from the first access point informing the second station of the start of a channel sounding interval allowing spatial reuse and/or to receive channel estimation sequences from the first access point allowing the second station to estimate the channel information for subsequent transmission of the estimated channel information to the first access point in response to the trigger and/or to receive allocation information indicating one or more first resource units allocated to one or more first stations and indicating one or more second resource units that are allocated to the second station or unallocated.

14. The second station as claimed in claim 11,
wherein the circuitry is configured to transmit a first channel estimation sequence to the first access point that is orthogonal to a channel estimation sequence transmitted by any other station and/or to derive information indicating which orthogonal channel estimation sequence to transmit from the trigger.

15. The second access point comprising circuitry configured to
communicate with one or more second stations associated with the second access point,
receive a trigger from a first access point to start estimating a channel between the second access point and one or more first stations associated with the first access point and/or one or more second stations,
determine channel information based on data units transmitted from one or more of said first and second stations, said data units containing channel estimation sequences enabling channel estimation and/or channel feedback information,
identify one or more second stations using resource units allocated for spatial reuse or random access by the first access point, and
transmit identification information to the first access point indicating if and/or for which one or more second stations spatial reuse is possible or considered.

16. The second access point as claimed in claim 15,
wherein the circuitry is configured to transmit power recommendations to the first access point indicating transmit powers recommended for use by the one or more second stations for which spatial reuse is possible and/or to inform the one or more second stations for which spatial reuse is considered that they can participate in a spatial reuse sounding phase and/or that they can use spatial reuse and/or which pilot patterns they shall use and/or to transmit a set of identifiers to the second stations to let them know which pilot patterns to use.

17. A method for use by a first access point comprising
communicating with one or more first stations associated with the first access point,
transmitting a trigger requesting stations to transmit data units containing channel estimation sequences enabling channel estimation and/or channel feedback information,
determining channel information based on channel estimation sequences and/or the channel feedback information transmitted from one or more of said first stations and from one or more second stations associated with a second access point, and
determining, based on the determined channel information, spatial reuse parameters for use by the first access point for reception of data during spatial reuse of resources by (i) one or more of said first stations for transmission of data to the first access point and (ii) by one or more of said second stations for transmission of data to the second access point.

18. A method for use by a second station comprising
communicating with an associated second access point,
receiving a trigger from a first access point to which one or more first stations are associated, the trigger requesting stations to transmit data units containing channel estimation sequences enabling channel estimation and/or channel feedback information,
transmitting channel estimation sequences enabling channel estimation and/or channel feedback information to the first access point,
receiving, from the second access point or the first access point, an individual transmit power level or individual transmit power limit,
receiving, from the first access point, resource allocation information indicating resource units allocated to the second station for spatial reuse, and
transmitting data, using the allocated resource units and the received individual transmit power level or a transmit power level equal to or lower than the received individual transmit power limit, during spatial reuse of resources allocated by the first access point to one or more of said first stations for transmission of data to the first access point.

19. A method for use by a second access point comprising
communicating with one or more second stations associated with the second access point,
receiving a trigger from a first access point to start estimating a channel between the second access point and one or more first stations associated with the first access point and/or one or more second stations,
determining channel information based on data units transmitted from one or more of said first and second stations, said data units containing channel estimation sequences enabling channel estimation and/or channel feedback information,
identifying one or more second stations using resource units allocated for spatial reuse and/or random access by the first access point, and
transmitting identification information to the first access point indicating if and/or for which one or more second stations spatial reuse is possible or considered.

\* \* \* \* \*